(12) United States Patent  
Wheeler et al.

(10) Patent No.: US 8,060,533 B1
(45) Date of Patent: Nov. 15, 2011

(54) PANEL-BASED MANAGEMENT OF DATA OBJECTS FROM A PLURALITY OF DATA SOURCES

(75) Inventors: Aaron Wheeler, San Francisco, CA (US); Luis Ricardo Prada Gomez, Hayward, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/177,999

(22) Filed: Jul. 7, 2011

(51) Int. Cl.
G06F 17/30 (2006.01)
(52) U.S. Cl. .................................... 707/791; 707/802
(58) Field of Classification Search .............. 707/791, 707/802
See application file for complete search history.

(56) References Cited

U.S. PATENT DOCUMENTS

| | | | |
|---|---|---|---|
| 6,006,227 A * | 12/1999 | Freeman et al. | 707/695 |
| 6,160,551 A | 12/2000 | Naughton et al. | |
| 6,388,683 B1 | 5/2002 | Ishai et al. | |
| 6,522,342 B1 | 2/2003 | Gagnon et al. | |
| 6,772,143 B2 | 8/2004 | Hung | |
| 7,003,737 B2 | 2/2006 | Chiu et al. | |
| 7,292,243 B1 * | 11/2007 | Burke | 345/440 |
| 7,735,018 B2 | 6/2010 | Bakhash | |
| 7,769,794 B2 | 8/2010 | Moore et al. | |
| 7,840,979 B2 | 11/2010 | Poling, Jr. et al. | |
| 7,899,915 B2 | 3/2011 | Reisman | |
| 2006/0259511 A1 * | 11/2006 | Boerries et al. | 707/103 R |
| 2007/0094597 A1 | 4/2007 | Rostom | |
| 2007/0220441 A1 * | 9/2007 | Melton et al. | 715/781 |
| 2010/0023506 A1 | 1/2010 | Sahni et al. | |
| 2010/0318500 A1 | 12/2010 | Murphy et al. | |
| 2010/0332818 A1 | 12/2010 | Prahlad et al. | |
| 2011/0107220 A1 | 5/2011 | Perlman | |
| 2011/0125844 A1 | 5/2011 | Collier et al. | |

FOREIGN PATENT DOCUMENTS

WO   WO 2010/135184   11/2010

OTHER PUBLICATIONS

D.L. Kaminsky, "Displaying User Information as Streams with Kinks" (RD v41 n410 06-98 article 410136), IBM, Jun. 1, 1998.

* cited by examiner

*Primary Examiner* — Son T Hoang
(74) *Attorney, Agent, or Firm* — McDonnell Boehnen Hulbert & Berghoff LLP

(57) ABSTRACT

A mechanism for providing panel-based management of data. In accordance with instructions on a machine-readable medium, a computing system receives data objects from various sources such as various user devices and application servers. Further, the computing system causes a device to display a graphical user interface through which a user can define panels that will be associated with various received data objects, so as to define a record, by time or subject matter, of relevant data objects. Further, the computing system allows a user to readily switch from display of one panel to display of another panel, so as to assist the user with multi-tasking and associated context switching.

18 Claims, 11 Drawing Sheets

PANEL-BASED MANAGEMENT OF DATA OBJECTS FROM A PLURALITY OF DATA SOURCES

BACKGROUND

With advances in technology, people today are exposed to an ever-increasing quantity of information. Over the course of a single day, for instance, it is now commonplace for a person to interact with many different devices, both locally and through network communication, and to exchange data with those devices. For example, a person may locally interact with various applications on traditional computing or communication devices such as personal computers, cell phones, music players, media recorders, televisions, and gaming devices, and a person may interact via a network with traditional application servers, such as social networking servers, e-mail servers, text messaging servers, cellular network servers, travel management servers, photo or video management servers, and the like. Further, a person may interact with less traditional computing or communication devices, such as household appliances, vehicles, security system servers, and the like.

Given all of this information, it also becomes increasingly necessary for people to multi-task or often switch from focusing on one set of information to focusing on another set of information. For instance, at one moment, a person may be using a word processor on a personal computer to compose a particular document, and may have an open web browser session to assist in preparation of the document, while listing to soothing music from a music player. Yet at the next moment, the person may receive a phone call that causes the person to discuss a new topic and perhaps causes the person to browse to a different page and to engage in e-mail or text messaging communication regarding that other topic and to turn on a television program regarding that other topic. Further, the person may then log into a social networking account to view wall posts. And at some point thereafter, the person may switch back to composing the document with the assistance of the web browser, while listening to music from the music player.

Unfortunately, however, switching back and forth between data interaction like this, particularly when interacting with numerous different devices and applications, can become hard to manage. While it may be easy for a person to quickly switch from one project to another, it may be particularly difficult for the person to maintain continuity of individual projects when juggling so many projects over time.

SUMMARY

Disclosed herein is a technological mechanism (e.g., method, apparatus, or system) to help a person keep track of and recall the person's data interactions, so as to facilitate improved multi-tasking. The mechanism can be usefully employed in a scenario where the person interacts with numerous devices, or even where the person just interacts with numerous applications on a single device. The mechanism provides for collecting data objects related to a person's data interaction with one or more devices and providing a graphical user interface through which the person can define, store, and recall "panels," each of which is dynamically associated with the received data objects based on timestamps of the data objects (e.g., as a record of the person's data interaction at a particular time) and/or based on subject matter of the data objects (e.g., as a record of the person's data interaction regarding a particular subject). Advantageously, panels may therefore be established to dynamically track various data interaction projects by the person (e.g., data interaction that occurred at a particular time, and/or data interaction that related to a particular subject), and panels may be retrieved and updated to help facilitate multi-tasking.

In one respect, disclosed is a non-transitory computer readable medium having stored thereon instructions executable by a computing system to carry out various functions including receiving data objects from a plurality of sources (e.g., devices, applications, etc.), storing panels each defining a respective association with a set of the received data objects, causing a display of a device to display a graphical user interface through which to present the received data objects, present created panels, and allow creation and/or further definition of new panels.

In practice, the received data objects each define a record of information regarding a device event and/or device state, such as an event or state that would involve user interaction or in some manner impact or relate to a user for instance. Further, each of the received data objects includes a timestamp, such as a timestamp indicating a time of the recorded information and/or a timestamp indicating a time of receipt of the data object.

The panels that each define a respective association with a set of the received objects may include "time-based panels" and "subject-matter panels". A time-based panel is a panel that defines an association with received data objects based on timestamps of the received data objects, and may thus function to establish a record of data objects regarding device event or state during a particular period of time, such as the period of time when the panel is being displayed and/or has focus. A subject-matter panel, on the other hand, is a panel that that defines an association with received data objects based on subject matter of the received data objects. As such, a subject-matter panel may have a defined subject-matter filter indicating attributes of received data objects that would match the panel, so that data objects having those attributes can be automatically associated with the panel. A panel may also be a hybrid time-based panel/subject-matter panel, as where a time-based panel is limited by a subject-matter filter to be associated with just received data objects that match the subject-matter filter.

As noted above, the graphical user interface caused to be displayed on a device display may include a general data-feed component for presenting indicia of the received data objects. This component may provide a raw, chronological display of data object indicia as the data objects are received. Further, the indicia of the data objects presented in the general data-feed component may be selectable to cause the display to present the respectively indicated data objects. For instance, each indicium may be a link to a more full rendition of the data object, and upon receipt of user input invoking the link, the computing system may cause the display to display the more full rendition of the data object. Each indicium may include a representative icon (e.g., associated application icon) and/or descriptive text.

Further, the graphical user interface may include a panel-presentation component for presenting indicia of previously created panels. In practice, the presented indicium of each previously created panel may include presentation of an indicium of the set of received data objects associated with the panel. For instance, the panel-presentation component may include one section for each previously created panel, with each section denoting a panel title (user defined or computer generated) and providing indicia of one or more received data objects that are associated with the panel. In the event these panel presentations are abridged due to display size or the like, each presented panel could be selectable to cause the computing system to present an expanded view of the panel, such as expanded indicia of the associated data objects for instance.

In addition, the graphical user interface may include a panel-creation component for receiving a command to create a new panel. For instance, the panel-creation component may include a button selectable to cause the computing system to create a new panel. Further, the panel-creation component may present indicia of items that can be selected for use as basis to define a subject-matter filter for the panel. These selectable items may include the received data objects themselves, which could be indicated in much the same way that the general data-feed indicates them or may be indicated by the general data-feed itself. In addition or alternatively, the selectable items may include semantic objects that have been extracted from the received data objects, such as sender/recipient names extracted from e-mail or text messages, or subject matter words extracted from the body of telephone or e-mail communications for instance.

In practice, when creating or defining (e.g., further defining) a first panel, the computing system may receive data that corresponds with input representing selection of one or more of the presented indicia of items to be used as a basis to define the subject-matter filter for the first panel, and the computing system may responsively use that selection input as a basis to define a subject-matter filter for the first panel. For instance, the computing system may define the subject-matter filter for the first panel based on one or more attributes of the selected items, thereby causing the first panel's subject-matter filter to inherit, as limitations, the one or more attributes of the one or more selected items.

Further, in accordance with the instructions, the computing system may make a determination that one or more of the received data objects defines a record that a user device presented particular information at user request (which may mean that that user was interested in that particular information). Responsive to making that determination, the computing system may then determine an attribute of the particular information and automatically create and store a second panel having a subject-matter filter keyed to the determined attribute.

In another respect, disclosed is a method including various similar functions. In practice, the method may involve receiving into a computing system, from a plurality of devices, a plurality of data objects each representing device event information and/or device state information, again such as user interface data for instance. Further, the method may involve the computing system extracting one or more semantic objects from the received data objects, and the computing system causing a display of a device to display indicia of (i) a plurality of the received data objects and (ii) a plurality of the semantic objects extracted from the received data objects.

The method may further include the computing system receiving data that corresponds with input representing a selection of one or more of the presented indicia, and the computing system responsively using that selection as a basis to define a subject-matter filter for a first panel. In addition, the method may involve the computing system causing the display to present the first panel, possibly as a blank panel to start, or possibly presenting indicia of previously received data objects that the computing system determines fall within the subject-matter filter defined for the first panel.

Still further, the method may involve the computing system receiving additional data objects, again from one or more devices for instance, and updating the presented panel accordingly. In particular, the computing system may determine that one or more of the received additional data objects match the subject-matter filter of the first panel, and the computing system may responsively cause the display to present indicia of those received additional data objects in association with the presented first panel.

Moreover, the computing system may determine that one or more of the received data objects defines a record that a user device presented particular information at user request (which, again, may mean that the user was interested in that particular information). In response to that determination, the computing system may thus responsively determining an attribute of the particular information and automatically create and store a second panel having a subject-matter filter keyed to the determined attribute. And the computing system may cause the display to present the second panel.

In yet another respect, disclosed is a non-transitory computer-readable medium having stored thereon instructions executable by a computing system to carry out various functions to facilitate establishment and presentation of subject-matter panels and time-based panels.

For instance, the computing system may receive from a plurality of devices a plurality of data objects each representing device event information and/or device state information. Further, the computing system may extract one or more semantic objects from the received data objects, and the computing system may cause a display of a device to present indicia of a plurality of the received data objects and a plurality of the semantic objects extracted from the received data objects. The computing system may then receive data corresponding to input representing a selection of one or more of the presented indicia, and the computing system may use the selection as a basis to define a subject-matter filter for a first panel. Further, the computing system may cause the display to present the first panel.

In practice, the computing system may then receive additional data objects and may determine that the received additional data objects match the subject-matter defined for the first panel. In response to making that determination, the computing system may then associate the first panel with the received additional data objects and cause the display to present indicia of the received additional data objects in association with the presented first panel. Further, the computing system may store the first panel in association with the received additional data objects. Advantageously, the stored first panel may then be subsequently retrieved to provide a view of the data objects that were associated with the first panel, perhaps in addition to subsequently received data objects that fall within the first panel's subject-matter filter.

In addition, the instructions are executable by the computing system to facilitate a determination that one or more received data objects defines a record that a user device presented particular information at user request (again possibly indicating that the user was interested in that particular information) Further, the instructions are then executable, in response to that determination, to determine an attribute of the particular information and to automatically creating, store, and cause to be displayed a second panel having a subject-matter filter keyed to the determined attribute.

The instructions are also executable by the computing system to facilitate definition of a time-based panel. For instance, the computing system may receive data corresponding to input representing a request to create a time-based panel, and the computing system may responsively create and cause the display to present the time-based panel. At first, the time-based panel may thus be empty. However, while the display is presenting the time-based panel, the computing system may receive one or more further data objects and may automatically cause the display to present indicia of the one or more received further data objects in association with the presented time-based panel. Further, the computing system may store the time-based panel in association with the one or more received further additional data objects, to facilitate later recall of the time-based panel.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
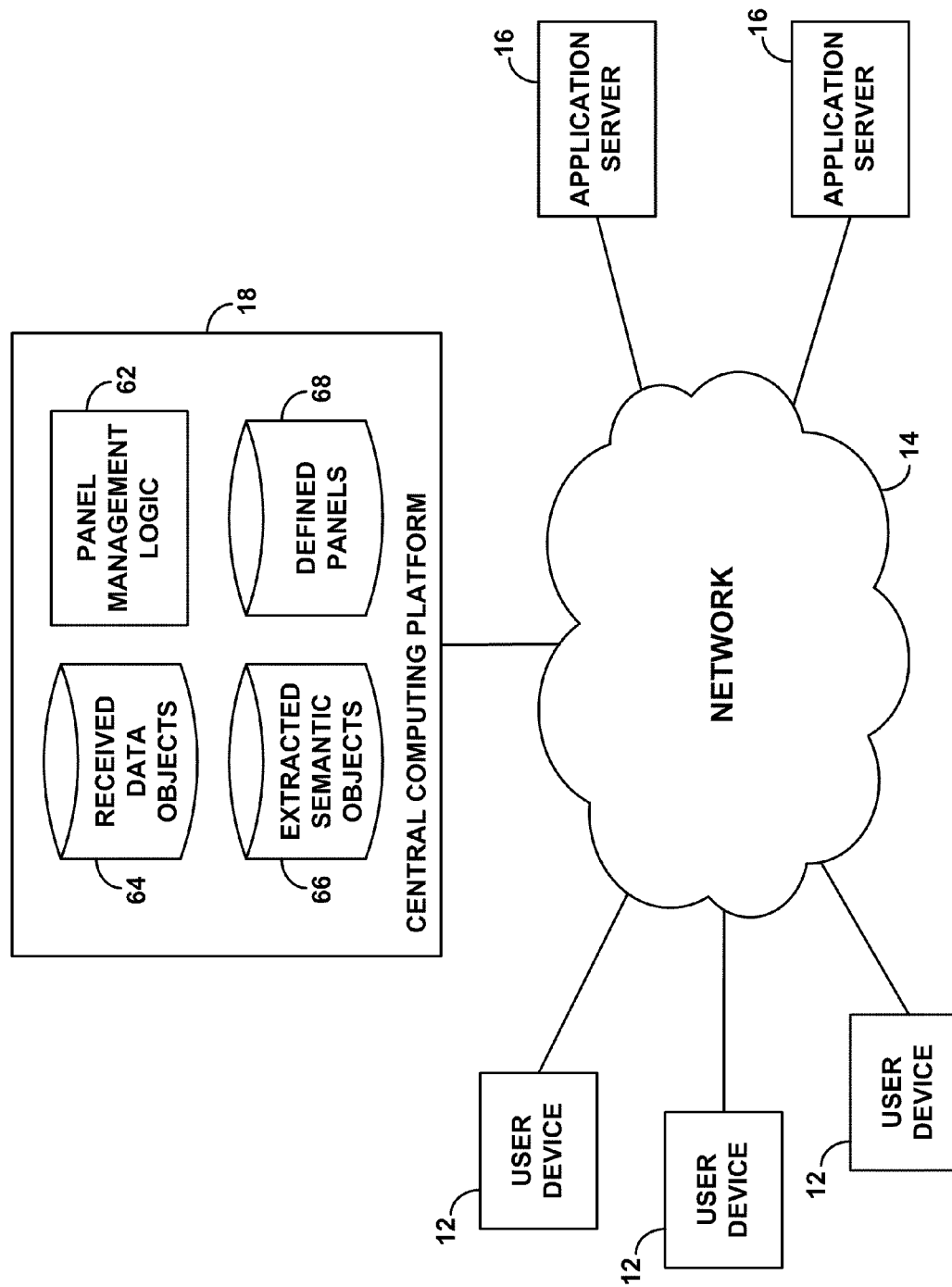
FIG. 1 is a simplified block diagram of an example system in which the present mechanism can be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

As a general matter the present mechanism can be implemented with a centralized computing system or on a single device computing system, or with a combination or variation of such systems.

In a centralized computing system implementation, a central computer or central computing platform such as a cloud server or other cloud-based computing system for instance may run a panel-management program that receives data objects from numerous devices that are in network communication with the central computer and that causes one or more of the devices to present the graphical user interface described herein. As the various devices experience particular events or changes in state, the devices may thus generate and transmit corresponding data objects to the central computer. Alternatively or additionally, if the central computer itself provides application functionality for one or more of the connected devices, such as in a cloud computing system where the devices are thin clients and applications run on a central server, the panel-management program running on the central computer may receive the data objects from various applications executed by the central computer itself.

On a given device, such as a mobile phone, tablet computer, notebook computer, or desktop computer for instance, the user may call up a panel-management client program, which (through network communication) may cause the central computer to deliver the graphical user interface for presentation on a display of the device. As the user interacts with the graphical user interface or otherwise with the device, representative data may then be transmitted to the central computer, to cause the computer to take further actions as described herein, such as creating new panels, defining panels, storing panels, and recalling previously defined panels for instance. Advantageously, these panels may thus represent event and/or state information regarding the various devices and/or applications that delivered data objects to the central computer, organized by time and/or subject matter.

In practice, such a central computing system implementation could be used to manage data interactions for multiple users. Each user may interact with numerous devices, and those devices may provide data objects to the central computer, perhaps with each data object being indexed to a user profile of the user (e.g., based on the user's account association with the devices, or in some other manner). The central computer may thus receive and store data objects associated with numerous users. Further, the central computer panel-management program may thus manage panels for numerous users, with each panel being indexed to a particular user profile.

When a given user invokes the panel-management client program on one of the user's devices and the central computer receives a request to provide the graphical user interface to the user's device, the central computer's panel-management program may limit its interaction with the user's device to be with respect to the data objects received from that user's devices or otherwise associated with the user's profile. Further, the central computer's panel-management program may limit its management and presentation of panels for the user's device to be just for panels likewise associated with the user's profile.

In a single device computing system implementation, on the other hand, a single user device such as a mobile phone, tablet computer, notebook computer, or desktop computer for instance, may receive data objects and may run a panel-management program that causes a display of the device itself to present the graphical user interface. In this implementation, the device may receive the data objects from numerous sources, such as applications or other logic modules running on the device itself, or from other devices in network connection (e.g., personal area network connection, or other network connection) with the device. Further, the panel-management program running on the device, by interaction with the user through the graphical user interface, would manage creation, definition, storage, and recalling of panels.

For simplicity of illustration and explanation, the present disclosure will focus on the central computing system implementation from this point forward. However, it should be understood that the disclosure is not restricted to that implementation and that the functions described herein can be applied by analogy in the single device computing system implementation and in other implementations.

Referring to the drawings, as noted above, FIG. 1 is a simplified block diagram of an example system in which the present mechanism can be implemented. As shown, the system includes a plurality of user devices 12 communicatively linked with a network 14, and the network then providing connectivity with a plurality of application servers 16. Further, shown sitting as a node on the network or otherwise accessible through the network is then a central computing platform 18, which serves as a core of the present panel-management mechanism.

User devices 12 are any devices with which a user may engage in local interaction. As noted above, examples of such devices include, without limitation, personal computers (e.g., desktop computers, notebook computers, tablet computers, or handheld computers), cell phones, music players, media recorders, televisions (e.g., set top boxes), gaming devices, appliances, vehicles, and security systems. In practice, each such device may include a user interface through which the device provides information to the user and/or receives information from the user.

Further, each such device may include logic such as applications for carrying out various functions, and the device and/or its applications may experience various events and state changes over time, much of which may be triggered by or may trigger user interface operation and may thus be of interest to the user.

By way of example, a personal computer may experience events and state changes such as powering on or off, connecting or disconnecting from the network 14, reaching a threshold power state, moving from one location to another (e.g., as indicated by GPS location tracking or WIFI SSID broadcast tracking), encountering errors, receiving user input, presenting output, or the like. Further, applications running on the personal computer may experience events and state changes such as being opened or closed, transitioning from being out of focus to being in focus (e.g., becoming a top-most window), detecting presence of other nearby devices (e.g., through near-field communication or other short-range wireless communication), and limitless events and state changes involving application-specific functions, such as saving and opening documents, sending and receiving messages, presenting alerts, receiving user input, and so forth.

As another example, a cell phone may experience events and state changes similar to those of a personal computer and may additionally experience events and state changes related to placing of calls, such as call attempts and successful call connections, missed calls, and the like. Likewise, as still another example, a television or associated set top box, or other type of media player or media recorder, such as a head mounted video camera for instance, may experience events and state changes also similar to those of a personal computer and may additionally experience events and state changes such as changing of media output, recording of media or change in recording of media, and so forth.

And as yet another example, a vehicle may experience user interface events and state changes, such as being powered on or off, moving from one location to another, traveling at a particular speed, reaching a threshold fuel state, experiencing engine or mechanical trouble, or the like. Numerous other examples exist as well, and still others will arise in the future.

Figure 2:
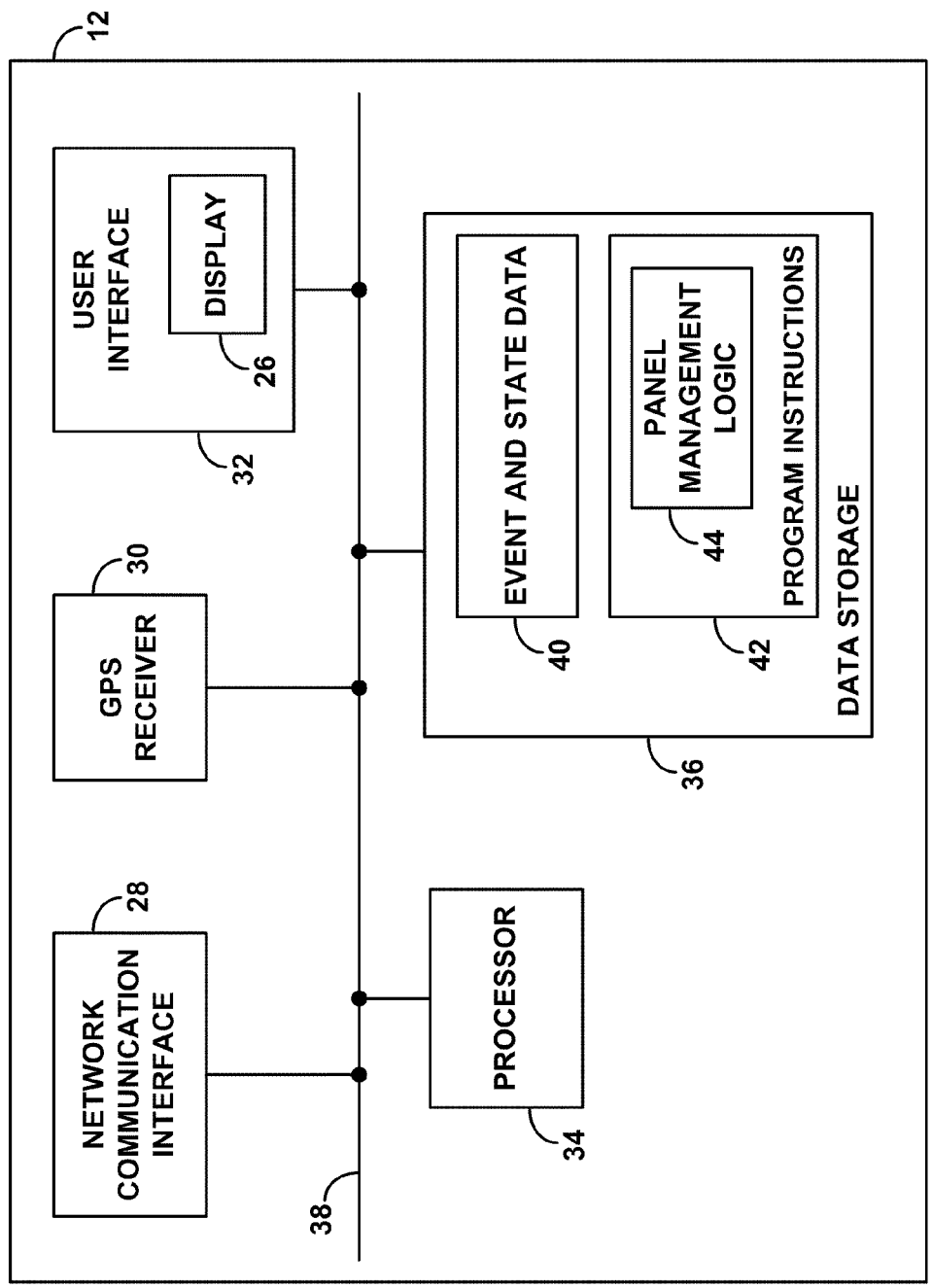
FIG. 2 is a simplified block diagram of an example user device.

FIG. 2 is a generalized block diagram depicting functional components of an example user device 12 that may be involved with the present panel-management process. As shown, the example user device 12 includes a network communication interface 28, a GPS receiver 30, a user interface 32, a processor 34, and data storage 36, all of which may be coupled together by a system bus, network, or other connection mechanism 38.

Network communication interface 28 may provide for wired and/or wireless communication in a personal area network, local area network, metropolitan area network, wide area network, or any other type of network. By way of example, the network communication interface may include a module for engaging in short-range wireless communication (e.g., RFID, WIFI, or BLUETOOTH communication) with other nearby device. As another example, the interface may include a module for engaging in wired Ethernet communication with a local router, which may provide for local area network communication and may further provide connectivity for wider area network communication. And as another example, the interface may include a module for engaging in cellular wide area network communication, such as through a cellular service provider's radio access network for instance.

GPS receiver 30 may comprise a standard global positioning system receiver, arranged to receive signals from a global satellite positioning system, so as to facilitate determination the location of the user device 12. Location determination may be carried out by the user device itself or possibly with assistance of a location-determination server on network 16.

User interface 32 functions to facilitate device interaction with a user and may thus take various forms. By way of example, the user interface may include output components such as a display screen 26 for providing visual output, a sound speaker and headset connection for providing audible output, a vibration generator for providing tactile (e.g., vibration) output, among others. Further, the user interface may include input components such as a keyboard, keypad, pointing device, touch-sensitive display screen, microphone, and video camera, among others.

Processor 34 may comprise one or more general purpose processors (e.g., INTEL microprocessors) and/or one or more special purpose processors (e.g., application specific integrated circuits and/or digital signal processors). Data storage 36 may then comprise one more volatile or non-volatile, non-transitory storage components such as magnetic, optical, organic, or solid state (e.g., flash) storage components, and may be wholly or partially integrated with processor 34.

As shown, data storage 36 is arranged to hold event and state data 40, and further contains program instructions 42 executable by processor 34 to carry out various user device functions described herein. For instance, as shown, the program instructions 42 may include panel-management logic 44, which may function (i) to cause user device 12 to record the various event and state data 40 as the user device experiences particular events and changes in state (ii) to generate data objects representing particular events and states, and (iii) to transmit those data objects to the central computing platform 18 for processing. Further, if and when the user device functions as the device whose display will present the graphical user interface of the panel-management system, the panel-management logic may further function (i) to receive the graphical user interface from the central computing platform, (ii) to present the graphical user interface, (iii) to receive user input provided through the graphical user interface, and (iv) to transmit data corresponding to that received input to the central computing platform.

In a likely implementation, the user device 12 represented by FIG. 2 may be a personal computer, such as a notebook computer, tablet computer, or handheld computing device. In another possible implementation, however, the user device 12 could be a computing device designed to be worn on a person, such as a head-mounted device. If such a device is structured as a pair of glasses, for instance, display functionality could be provided by miniature video projection onto the lenses of the glasses so as to provide an up-front display for the wearer. Further, various input mechanisms could be provided, including but not limited to a temple-based touchpad, a camera to detect eye movement on or in relation to the plane of the up-front display, or a separate input device. Other arrangements are possible as well.

Returning to FIG. 1, application servers 16 may be any computer servers or platforms with which a user may interact via network 14. As noted above, examples of such servers include, without limitation, social networking servers, e-mail servers, text messaging servers, cellular network servers, travel management servers, photo or video management servers, and the like. In practice, each such server may provide a web-based mechanism for interacting with the user or may otherwise facilitate interaction with the user. In operation, each such application server, like the user devices described above, may thus provide information to the user and/or receive information from the user.

Further, each such application server may likewise include logic such as applications for carrying out various functions, and the application server and/or its applications may experience various events and state changes over time, much of which may be triggered by or may trigger user interface operation and may thus be of interest to the user.

By way of example, a social networking server may maintain an account for the user and, upon user login, may present the user with wall posts from designated social-network friends of the user, as well as assorted other information likely relevant to the user. Further, the social networking server may receive wall posts and other information entered by the user, to post for viewing by others. Events and state changes experienced by such a server may thus include user login and logout, receipt of new wall posts from the user or the user's friends, and the like.

As another example, e-mail and text messaging severs may function to receive, store, and send messages to and from the user, and instant messaging servers may likewise function to send and receive messages to and from the user and may further function to track and report presence status of the user. Thus events and state changes that may be experienced by such servers may include transmission of messages from one user to another and detecting and reporting change in presence status of a user.

As still another example, a cellular network server such as a mobile switching center, media gateway, home location register, authentication center, home agent, billing server, or the like may function to track and manage operation of cellular communication devices, such as to process device registrations, route calls, and track usage for billing purposes. Thus, events and state changes that may be experienced by such servers may include recording cell phone registration and authentication, recording cell phone usage, and the like. Again numerous other examples may exist now or be developed in the future.

Figure 3:
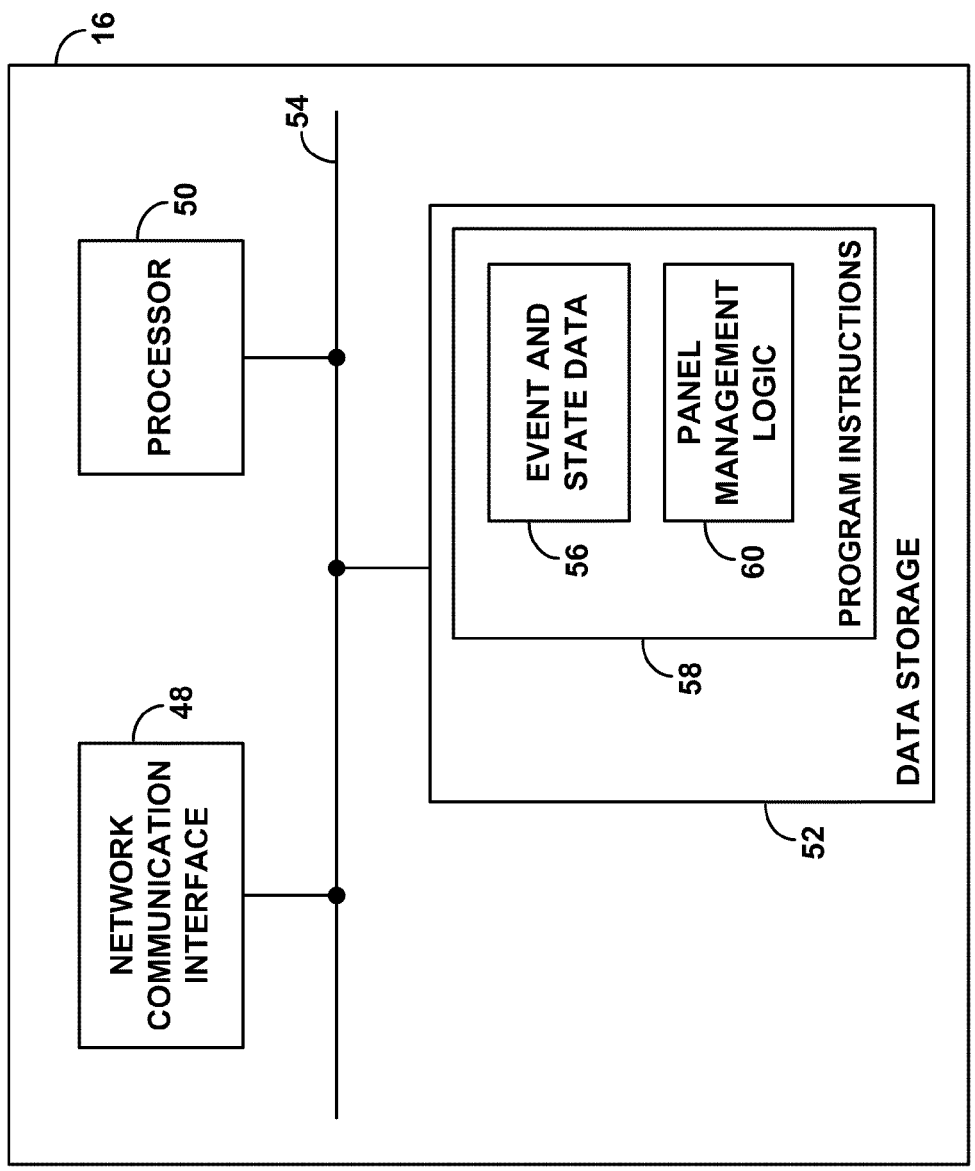
FIG. 3 is a simplified block diagram of an example application server.

FIG. 3 is a simplified block diagram depicting functional components of an example application server 16 that may be involved with the present panel-management process. As shown, the example application server 16 includes a network communication interface 48, a processor 50, and data storage 52, all of which may be coupled together by a system bus, network, or other connection mechanism 54.

Network communication interface 48 may comprise any module that enables the application server to communicate on network 14, so as to facilitate communicating with user devices 12 and central computing platform 18 for instance. By way of example, the network communication interface may be a wired or wireless Ethernet network interface, coupled by one or more routers or other connection devices with network 14.

Processor 50 may comprise one or more general purpose processors (e.g., INTEL microprocessors) and/or one or more special purpose processors (e.g., application specific integrated circuits and/or digital signal processors). Data storage 52 may then comprise one more volatile or non-volatile, non-transitory storage components such as magnetic, optical, organic, or solid state (e.g., flash) storage components, and may be wholly or partially integrated with processor 50.

As shown, the data storage 52 of the example application server, like the data storage of the various user devices, may be arranged to hold event and state data 56, and may further contain program instructions 58 executable by processor 50 to carry out various application server functions described herein. For instance, as shown, the program instructions 58 may include panel-management logic 60, which may function (i) to cause application server 16 to record the various event and state data 40 as the application server experiences particular events and state changes, (ii) to generate data objects representing particular events and states, and (iii) to transmit those data objects to the central computing platform 18 for processing.

Again returning to FIG. 1, the cloud shown as network 14 is generally representative of one or more networks that can support communication between the various devices and servers shown. For instance, network 14 may comprise the public Internet and may further comprise any number of private networks, such as local area networks, service provider core networks, and so forth. In practice, network 14 may thus include numerous network connections, whether wired and/or wireless, in addition to routers, switches, gateways, and other devices to facilitate communication of data from one node to another.

Network 14 may support communication according to the Internet Protocol (IP) or according to any other protocol. In practice, for instance, devices that communicate on the network may each have a respective IP address, and communications may pass from one node or another in the form of IP packets originating at a source IP address and arriving at a destination IP address. In some cases, this IP communication may further involve various levels of network address translation to facilitate communication to and from nodes on private networks.

Further, application level communications between nodes on network 14 may be carried out according to any agreed protocol. By way of example, nodes may communicate with each other according to the Hypertext Transfer Protocol (HTTP) or Session Initiation Protocol (SIP), or using more advanced interactive web applications such as Asynchronous JAVASCRIPT and XML (AJAX), each of which is well known and therefore not described here. Numerous other examples may be possible as well.

As noted above, central computing platform 18 serves as a core of the illustrated embodiment, by receiving data objects from various devices (e.g., user devices and application servers), and causing the display of a user device to present a graphical user interface that allows a user to create and manage panels. To facilitate this functionality, as shown in FIG. 1, the central computing platform 18 includes panel-management logic 62, received data objects 64, extracted semantic objects 66, and defined panels 68.

In practice, central computing platform 18 may take the form of a one or more computer servers. For instance, the platform may be implemented in a cluster-based computing environment, where a number of computers are clustered together (e.g., physically proximate to each other, on one or more racks for instance) or interconnected to each other by a network switching system (e.g., one or more switches or routers), with application logic possibly being distributed and replicated among the various computers.

Figure 4:
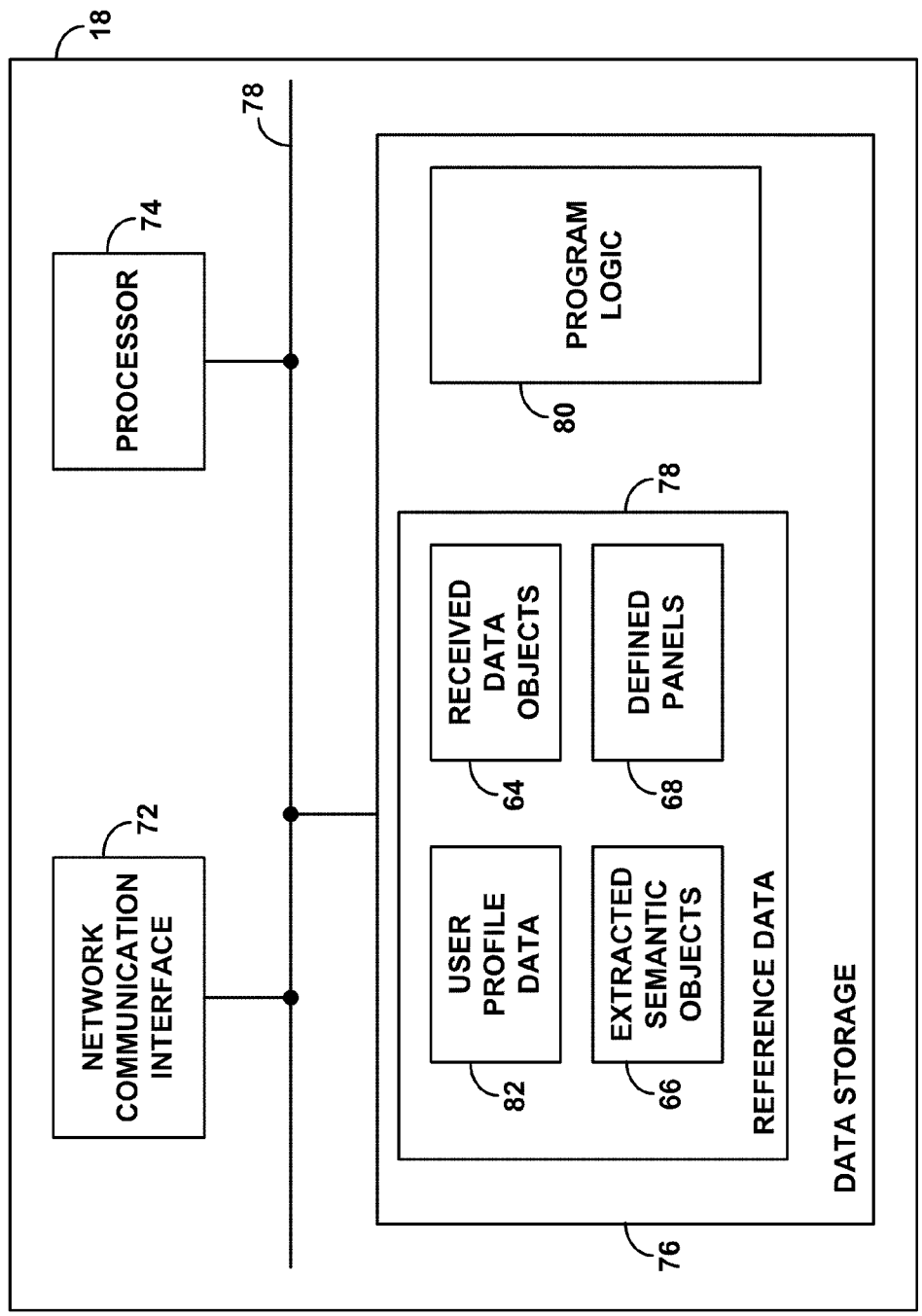
FIG. 4 is a simplified block diagram of an example central computing platform.

FIG. 4 is a simplified block diagram depicting functional components of an example central computing platform 18 in somewhat greater detail than shown in FIG. 1. For simplicity, however, FIG. 4 does not depict a cluster-based computing environment. As shown in FIG. 4, the example central computing system includes a network communication interface 70, a processor 72, and data storage 74, all of which may be coupled together by a system bus, network, or other connection mechanism 76.

Network communication interface 70 may comprise any module that enables the central computing platform to communicate on network 14, so as to facilitate communicating with user devices 12 and application servers 16 for instance. By way of example, the network communication interface may be a wired or wireless Ethernet network interface, coupled by one or more routers or other connection devices with network 14.

Processor 72 may comprise one or more general purpose processors (e.g., INTEL microprocessors) and/or one or more special purpose processors (e.g., application specific integrated circuits and/or digital signal processors). Data storage 74 may then comprise one more volatile or non-volatile, non-transitory storage components such as magnetic, optical, organic, or solid state (e.g., flash) storage components, and may be wholly or partially integrated with processor 72.

As shown, the data storage 74 of the example central computing platform is arranged to hold reference data 78 and program logic 80. In practice, reference data 78 may include user profile data 82, received data objects 64, extracted semantic objects 66, and defined panels 68. Program logic 80 may then include program instructions (e.g., machine language instructions) executable by processor 72 to carry out various central computing platform functions described herein, particularly to facilitate various the panel-management functions for one or more users.

In practice, it will be understood that data storage 74 thus represents an example of a non-transitory computer-readable medium having stored thereon instructions executable by a computing system to carry out various panel-management functions described herein. However, in other implementations, the non-transitory computer-readable medium containing such instructions could take various other forms, such as a CD-ROM, a DVD-ROM, a magnetic disk drive, or other removable or non-removable, non-transitory computer readable medium.

User profile data 82 may comprise user profiles for various users or groups of users who have a panel-management account or who have an account for a service that also provides for panel-management. As such, user profile data 82 may identify each user or group by a username or other unique identifier. Platform 18 may make use of user profile data 82 to authorize users seeking to use the panel-management service. Further, as platform 18 creates panels for a particular user, the platform may index those panels to the user's identifier, and the platform 18 may filter the received data objects by the user's identifier so that panels indexed to the user's identifier will be limited to association with received data objects that are indexed to the same user's identifier.

Received data objects 84 are the data objects that the platform 18 receives from various devices, such as user devices 12 or application servers 16 for instance. As noted above, each data object may be a data representation of particular event or state information regarding a device, an application. Without limitation, examples of event and state information regarding a device include information specifying the device's power status, the device's network presence, the device's location, any user-interface operation (e.g., instances of use of particular device features) and others described above. Also without limitation, examples of event and state information regarding an application include records of file storage or retrieval, records of document versions and websites visited, records of calls placed and received or messages sent and received, records of calendar notifications, screenshots showing application windows open from time to time, and others described above.

Received data objects 84 may also represent other event or state information of relevance to the user, such as information about the user's environment as determined by one or more user devices 12 or application servers 16. Without limitation, examples of such environmental information include (i) the location of the user (e.g., as determined by a cell phone or other device operated by the user), (ii) weather conditions experienced by the user or in the user's vicinity (e.g., as determined by a user device 12 or by one or more sensors reporting to an application server 16), and (iii) aural and visual information in the user's environment (e.g., as captured by a media recording device operated by, for, or near the user, perhaps with the media recording device or platform 18 converting such media into corresponding text or another form that can be evaluated to determine its content). In practice, to help focus on information of specific relevance to the user, each data object may define a record of information regarding user-interface operation, such as input received via a device user interface or information provided by a device user interface.

Source devices may generate and transmit data objects to the platform 18 automatically in when various device events or state changes occur or in response to user input requesting the source device to record an event or state. For example, each time a personal computer opens a new application, or a tab or other subset of an application, the personal computer may automatically capture a screenshot, descriptor, or other data representing the opened application or subset as a data object and may transmit that data object to platform 18. As another example, each time a media player plays a particular media selection, the media player may automatically record an identification of the media selection or perhaps the media selection itself as a data object and may transmit that data object to platform 18. As still another example, each time a social networking server receives a wall post for a user's account, the social networking server may record that wall post as a data object and may transmit that data object to platform 18. As yet another example, each time a cellular network server handles a call or data session to or from a given user, the server may make a record of that call as a data object and may transmit that data object to platform 18. Numerous other examples are possible as well.

In practice, each received data object may have one or more attributes that function to characterize the substance of the data object, and each data object may include metadata (e.g., header data) that specifies its one or more attributes.

For example, a data object representing a screen shot of a particular application may have as one attribute the name of the application and as another attribute a descriptor of a state of the application (e.g., the name of an open document, identification of tabs open in the application, or the like). As another example, a data object representing an e-mail or text message sent to or from a user may have as one attribute the identity one or more other parties to the message, and may have as another attribute one or more key words gleaned programmatically from the body of the messages. As still another example, a data object representing media captured by a media recording device operated by a user may have as an attribute one or more keywords similarly gleaned programmatically from the media content. And as yet another example, a data object representing event or state information regarding a work matter (e.g., involving a work related user device, or occurring during working hours) may have as an attribute that the data object is work related, whereas a data object representing event or state information regarding a personal matter (e.g., involving a home/personal device, or occurring during non-work hours) may have as an attribute that the data object is personal related.

When generating and transmitting data objects to platform 18, source devices themselves may add attribute metadata to each data object. For instance, if a source device has captured a screen shot of a particular application in response to a user invoking the application or bringing the application into focus, the source device can readily add metadata specifying the name of the application and other data that characterizes the current state of the application. Likewise, if a source device has captured media content, the source device (by itself or with assistance from a application server) may programmatically evaluate the content to identify particular words or phrases and to thereby identify the content and one or more key words included in the content, and the source device may then add that information as metadata.

Alternatively or additionally, platform 18 may evaluate received data objects and may itself add metadata to the received data objects to characterize attributes of the data objects. For example, if a source device sends a data object defining a record of a text message to the platform, the platform may programmatically evaluate the text message to identify one or more other parties to the text message, and the platform may then add metadata to the data object to specify the names of the identified one or more other parties. And as another example, if a source device sends to the platform a data object defining a screen shot of a particular application window, the platform may programmatically evaluate the screen shot image to identify the application, and the platform may then add an application name as metadata to the data object. Numerous other examples are possible as well.

To facilitate user-friendly display of data object indicia in the graphical user interface, each data object may specifically include metadata that associates the data object with a particular application or class of data objects, and a graphical icon may be associated with each application or class. For example, a data object representing an event or state related to a word processing application may include metadata classifying the data object as word processing related, so that when an indication of the data object is displayed, an icon related to word processing can be displayed as a quick indication of the data object class. As another example, a data object representing a message sent to or from a particular person may include metadata classifying the data object as being related to that person, so that when an indication of the data object is displayed, an icon related to that person (e.g., a thumbnail image of that person) can be displayed as a quick indication of the data object class. As yet another example, a data object related to a calendar event may include metadata classifying the data object as a calendar event, so that when an indication of the data object is displayed, a calendar icon can be displayed as a quick indication of the data object class.

In practice, each data object may also include metadata that indexes the data object to a respective user profile, such as by specifying a user identifier for instance. This user profile metadata may be added programmatically by the source device, based on information about which user is currently logged into the source device for instance. Alternatively, upon receipt of a data object from a source device, the platform may add the user profile metadata based on which source device (e.g., associated with a particular user profile) provided the data object. Other ways to index a data object to a particular user profile may be possible as well.

Further, each data object may include a timestamp. The timestamp can represent the data object creation time, such as when the source device made a record of a particular event or state for instance, and may thus be applied by the source device. If the source device promptly transmits the data object to the platform 18 after generating the data object, such a timestamp may also represent a data object transmission time. Alternatively, the timestamp can represent a time at which the platform received the data object, which may again be similar to the generation and transmission time. A timestamp may indicate time of day, day of week, date, and/or other time information.

Although FIG. 4 shows received data objects 84 being stored in data storage 74 of the platform 18, it may also be feasible to provide a separate storage server arranged to receive and store data objects provided by numerous devices for one or more users. In that arrangement, platform 18 may then regularly access the separate data storage to evaluate received data objects so as to determine data object association with panels defined for a particular user.

Extracted semantic objects 66 include data that specifies semantic objects extracted from various received data objects. These semantic objects may be much the same as the metadata of particular data objects or may be words, phrases or the like programmatically extracted (e.g., read) from content of the data objects, and may thus be extracted through analysis by the source device at the time the data object is created or extracted through analysis by the platform upon or after receipt of the data object. Extracted semantic objects 66 may themselves include metadata as well, such as user profile metadata to associate the semantic objects with particular user profiles, and timestamp metadata to indicate a relevant time such as a time of creation or receipt of the underlying data objects.

Defined panels 68, in turn, are core objects of the present panel-management system. Each panel may be stored as a panel object associated in a database relationship with a set of received data objects, so that when a panel is presented in the graphical user interface, indicia of its associated data objects may be presented for quick reference by a user. Further, each panel object may have a number of other attributes stored with it or in database association with it.

As noted above, at least two different types of panels are possible: a time-based panel and a subject-matter panel. A time-based panel is associated with data objects received while the panel is being displayed. Whereas, a subject-matter panel is associated with received data objects that match a subject-matter filter defined for the panel.

When a time-based panel is stored, it may be stored with an indication of the time (e.g., time range) when it was active. And when the graphical user interface presents an indication of an existing time-based panel, the graphical user interface may specify the time when the time-based panel was active. That way, a user can review the available panels and can readily identify one that related to the user's device interaction at a particular time.

When a subject-matter panel is stored, it may be stored with a specification of its subject matter filter. The subject-matter filter may be defined as a logical expression that limits the panel's data object association to objects having one or more particular attributes. For instance, a subject-matter filter may limit data object association to those data objects having attribute A or attribute B or attribute C. Other examples are possible as well.

In practice, platform 18 functions to receive and store data objects from various devices, such as user devices 12 and application servers 16, and platform 18 additionally functions to cause the display of a given user device to display a graphical user interface that supports data object browsing, panel presentation, and panel creation. FIGS. 5-10 are a series of images representing conceptually how this graphical user interface may look and operate in an example implementation. As with the other description throughout this document, it should be understood that many variations from this example are possible.

Each of FIGS. 5-10 presents an image representing a touchscreen display of a handheld communication device, such as a smart phone for instance. Due to the limited display space on such a device, it may not be possible for the display to show the entire graphical user interface at once. Rather, the display may present certain aspects of the graphical user interface in a scrollable manner, and the display may present various aspects of the graphical user interface one at a time, such as in the form of separate display windows, panes, tabs, cards, or the like. In an alternative embodiment, it is of course possible that more of the graphical user interface may be presented at once, such as by concurrently various sections of the type shown in the figures.

Further, where this document refers to "components" of the graphical user interface, it will be understood that such components may be discrete portions of the graphical user interface, such as separate windows for instance, or may be functional aspects of the graphical user interface that are not limited to discrete presentation. For instance, a given component that functions to present particular elements may also be used as part of another component that presents the same particular elements.

Optimally, much of the display in the example graphical user interface will be communicated dynamically (e.g., asynchronously) between the display device and the computing platform 18. For instance, upon initial request from the device, the platform may transmit a first display page to the device to cause the device to present the page, and the device may responsively present that page on its display. While the page is displayed, the device may then receive user input such as user clicking on a specific portion of the page, and the device may responsively transmit to the platform data corresponding with that user input. In response to such data or at any other time while the page is being displayed, the platform may then transmit to the device some updated content for the page, and the device may responsively present that updated content in the currently presented page, so as to dynamically (e.g., asynchronously) update the presented content.

For example, the platform may initially transmit to the device a page that lists particular panels or particular data objects, and the device may responsively present that page on its display. As the platform receives additional data objects that should be presented in association with a particular panel or should otherwise be presented in a list of data objects, the platform may then transmit to the device data that represents an update of the currently displayed page, such as to replace currently displayed indicia with other indicia, or to add new indicia to the display. As noted above, an interactive web application technology such as AJAX could be used for this purpose.

Furthermore, to allow the platform to programmatically determine when the device is presenting a given page, such as a page that represents a particular panel for instance, the device may be arranged to signal to the platform when the device closes the page or moves focus from the page. Alternatively, the device, possibly in accordance with logic encoded in the page, may transmit periodic heartbeat signals to the platform while the page is actively displayed, and the platform may programmatically determine that the page is no longer displayed once the platform detects absence of those heartbeat signals.

Figure 5:
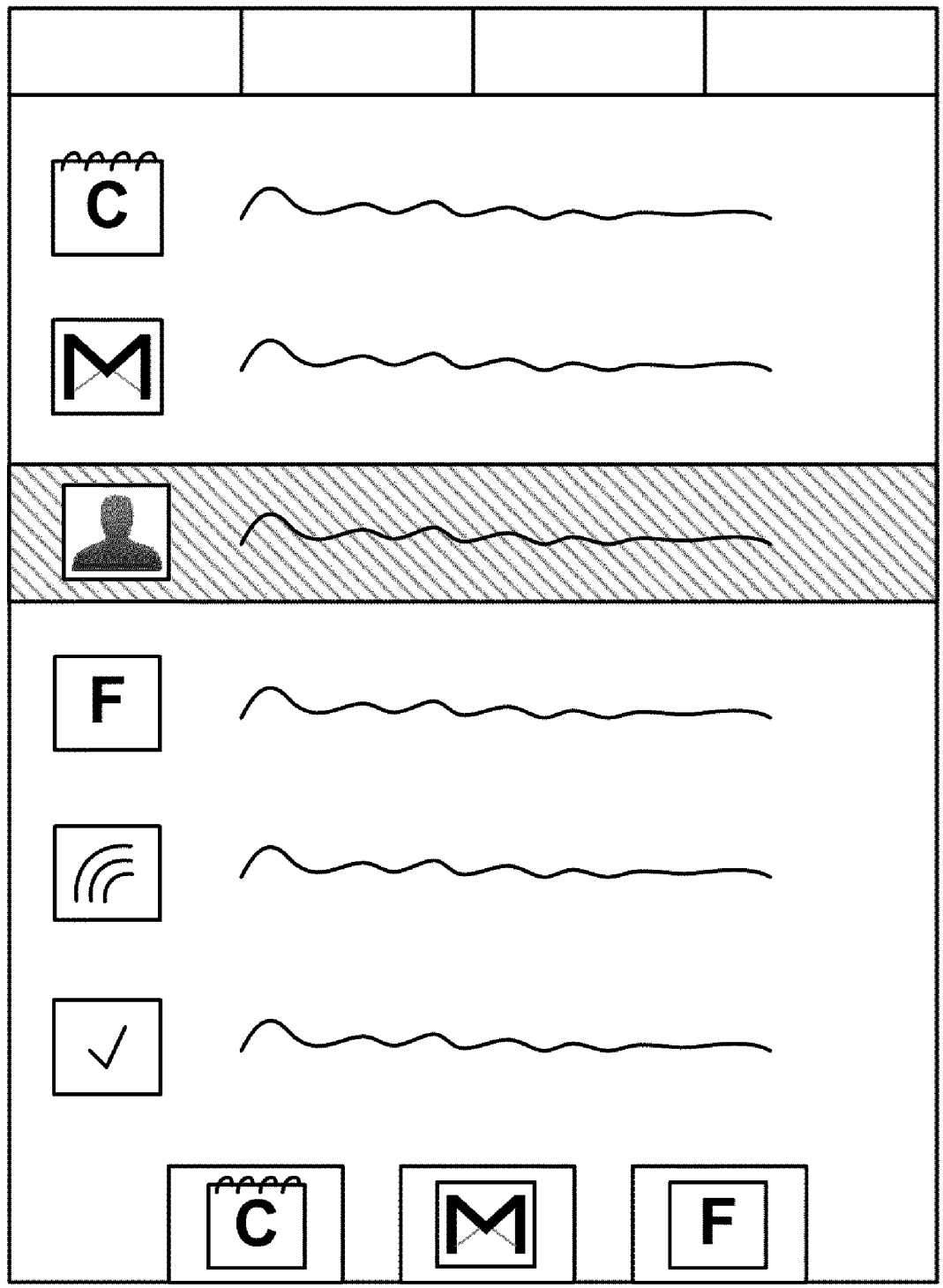
FIGS. 5-10 are illustrations of example user interface displays.

Referring now to FIG. 5, when a user first calls up the panel-management program in an example implementation, the platform may provide the user's device with a general data feed as shown. This data feed may present a raw list of received data objects related to the user's profile, possibly ordered reverse chronologically (e.g., with the latest received data object being presented first, and so forth). In particular, the display may present an indicia of each data object, conveniently with an icon representing the class of icon (e.g., calendar related, mail related, or other specific application related, or specific person related). Thus, as the platform receives additional data objects related to the user's profile, each representing event and/or state information regarding various ones of the user's devices, applications, or user environment, the platform may add indicia of those data objects to the general data feed presented to the user.

Shown at the bottom of the display screen in FIG. 5 are several example buttons that may be selectable to facilitate filtering the general data feed. For example, if the user clicks on the mail icon, the device may transmit to the platform data corresponding to that user input, and the platform may responsively update the general data feed to be limited to presentation of just mail-related data objects. Likewise, if the user clicks on the calendar icon, the device may transmit to the platform data corresponding to that user input, and the platform may responsively update the general data feed to be limited to presentation of just calendar-related data objects.

Figure 6:
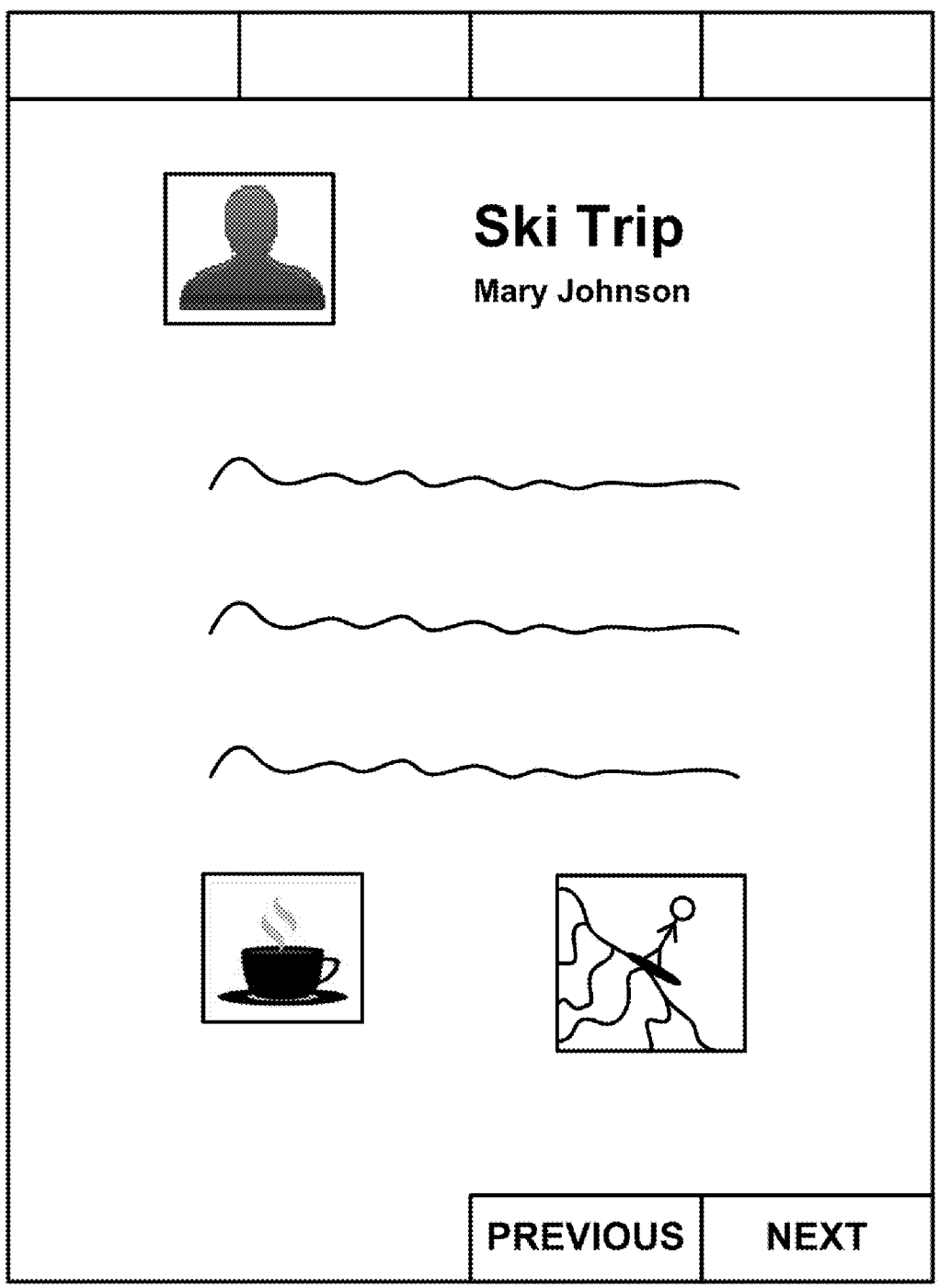

In operation, a user may select a particular one of the data object indicia shown in the general data feed, to cause presentation of expanded data regarding that data object. For instance, as shown in FIG. 5, the user may select the third illustrated data object, and as a result the system may present a display such as that shown in FIG. 6, providing additional details about the selected data object. In this example, the selected data object is a message from Mary Johnson, and the display in FIG. 6 presents full content of that message. Further, at the bottom of the display in FIG. 6 are "previous" and "next" buttons to allow a user to navigate to a previous or next data object of those listed in the general data feed.

Figure 7:
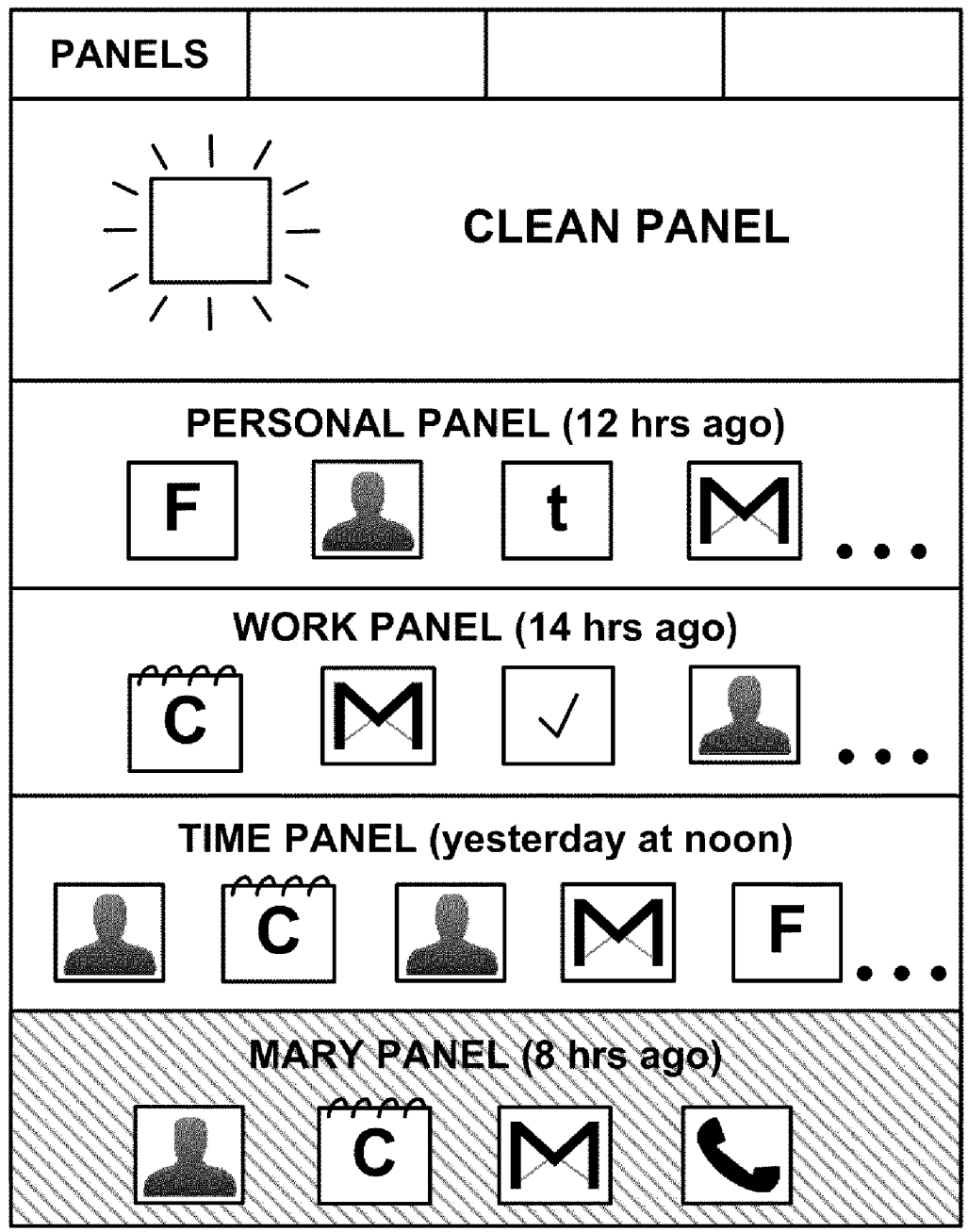

The top bar of the display screen may provide a number of selectable tabs to allow user navigation to other aspects of the graphical user interface. By way of example, one such tab may be a "panels" tab. Upon selection of the panels tab, in an example implementation, the system may present a panel-management page as shown in FIG. 7. The example panel-management page includes at its top a button selectable by the user to trigger creation of a new, clean panel.

Further, the page presents various previously defined panels, including by way of example a "work" subject-matter panel, a "personal" subject-matter panel, a time-based panel, and "Mary" subject-matter panel. The "work" subject matter panel may be defined by a subject-matter filter to be associated with data objects having a "work" attribute and is shown having been last updated 12 hours ago. The "personal" subject matter panel may be defined by a subject-matter filter to be associated with data objects having a "personal" attribute and is shown having been last updated 14 hours ago. The time-based panel is shown being associated with data objects from yesterday at noon. And the "Mary" subject matter panel may be defined as by a subject-matter filter to be associated with data objects having "Mary" as an attribute, such as messages from Mary, phone calls with Mary, calendar items regarding Mary, and so forth, and is shown having been last updated 8 hours ago. On this page, each panel may be presented together with representative indicia of data objects associated with the panel.

Figure 8:
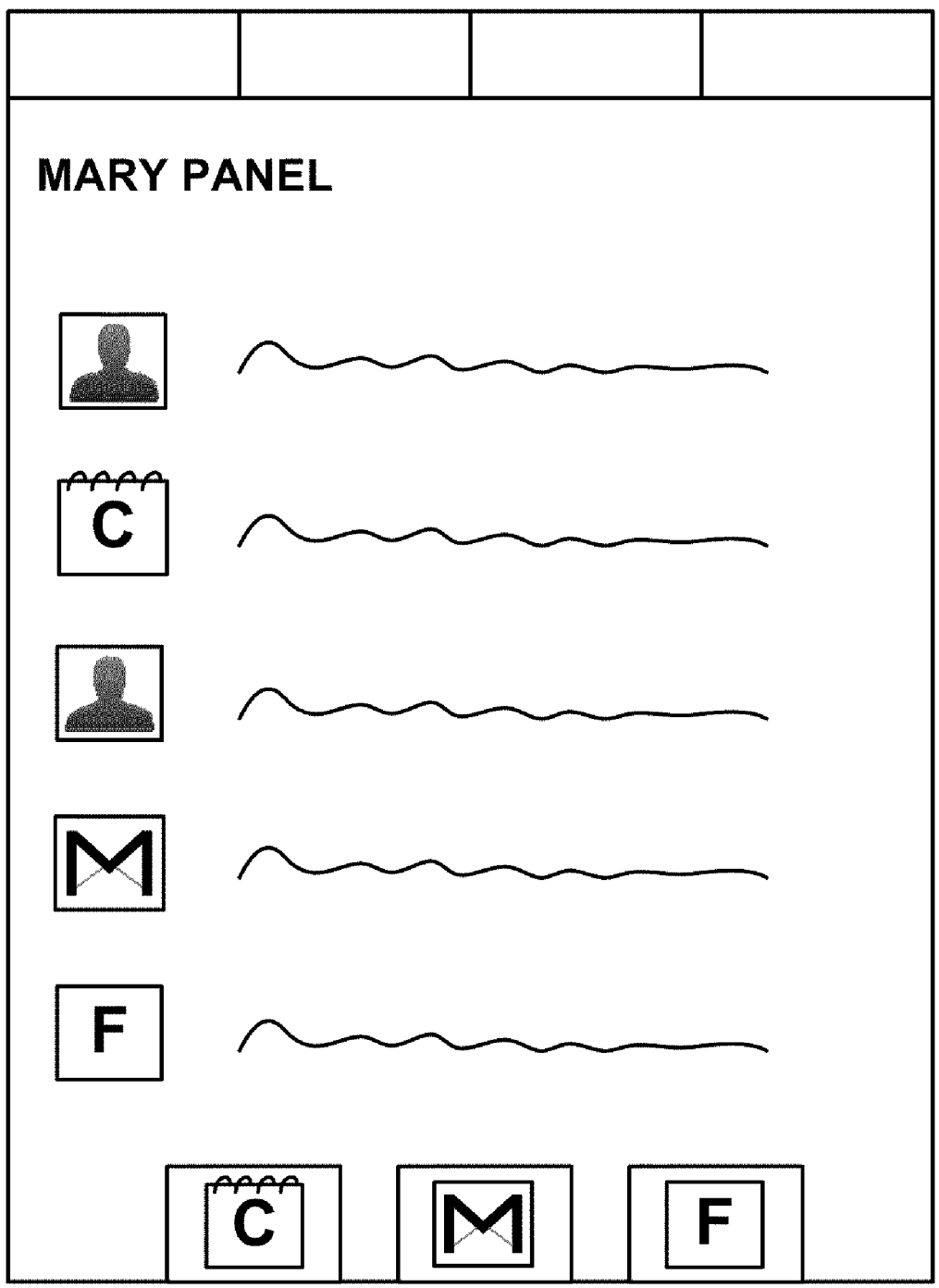

In practice, a user may select a particular one of the presented previously defined panels shown on this page, to cause presentation of expanded data regarding the panel, and to activate the panel. For instance, as shown in FIG. 7, the user may select the "Mary" subject-matter panel, and as a result the system may present a more full rendition of the "Mary" subject-matter panel as shown in FIG. 8. The more full presentation of the Mary panel in FIG. 8 may present a panel-specific data feed providing expanded indicia of received data objects that match the subject-matter filter of the Mary panel, again perhaps in chronological or reverse chronological order. Thus, any received data objects that were previously associated with the Mary panel may be shown, and the system may update the page to add to the panel any additional received data objects that match the Mary subject-matter filter. As with the general data feed, buttons may be provided at the bottom of the display screen to allow a user to filter the associated data objects if desired.

Figure 9:
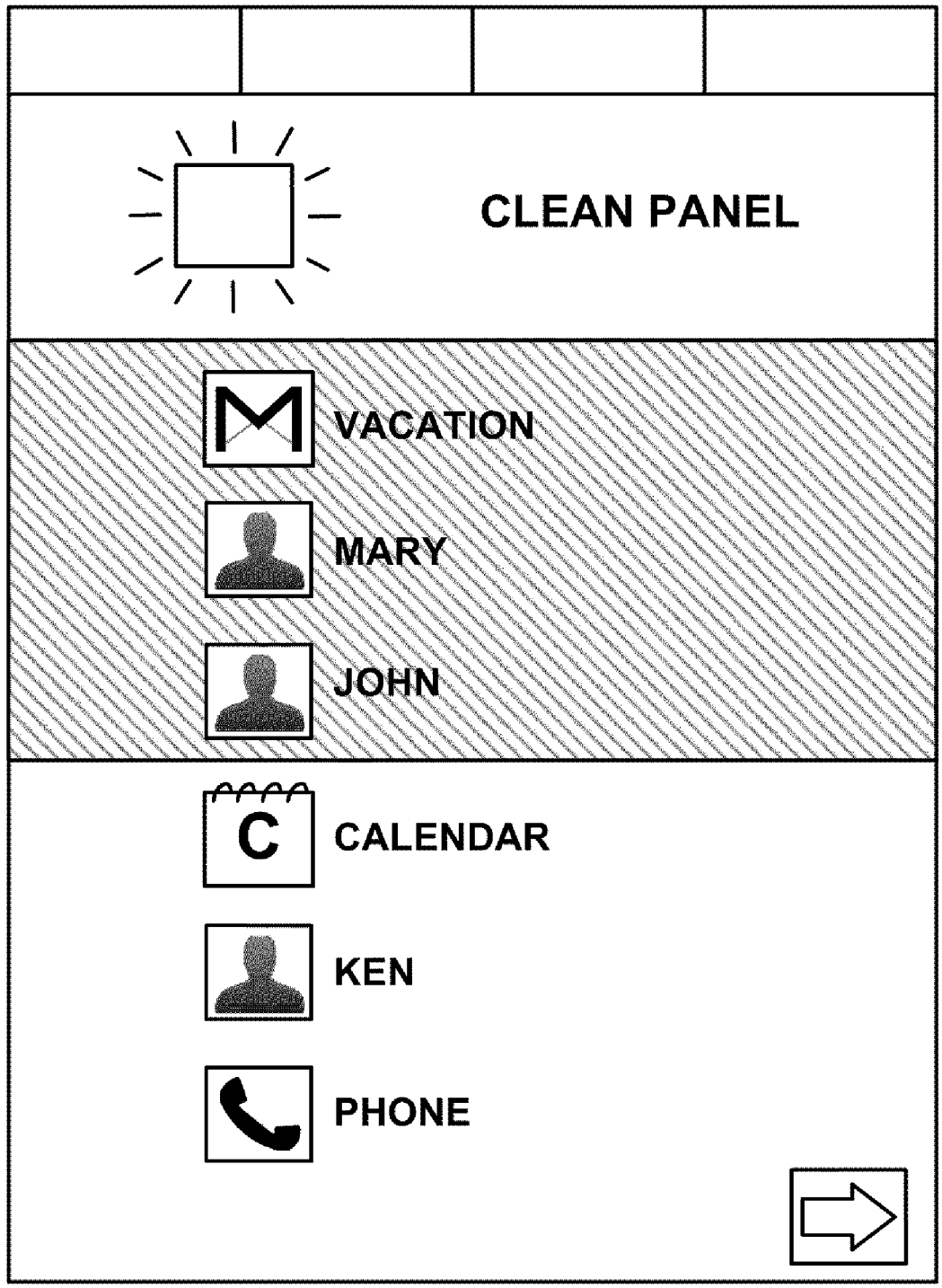

Returning to FIG. 7, if the user selects the "clean panel" button at the top of the panel-management page, the system may then responsively present the user with a panel-filter-definition page as shown by way of example in FIG. 9. By default, a command to create a new panel is a command to create a time-based panel unless and until a subject-matter filter is defined for the new panel. Thus, when a clean panel is created, the panel may constitute a time-based panel, becoming associated with any data-objects that are received while the panel is active. However, when the platform receives data corresponding to input representing a command to create a new panel received through the graphical user interface, the platform may responsively create a new panel and cause the display to present the panel-filter-definition page of FIG. 9. Conveniently, that page allows the user to define a subject-matter filter for the panel so as to make the panel a subject-matter panel (instead of or in addition to being a time-based panel).

The panel-filter-definition page of FIG. 9 presents indicia of various items that the user can select to be "promoted" to the panel, i.e., to have their attributes adopted as parameters of a subject-matter filter for the panel. In practice, these items may include received data objects of the general data feed and may further include semantic objects that the platform has extracted from those received data objects as described above. In terms of the extracted semantic objects, for instance, the platform may programmatically read, or otherwise analyze the content and/or metadata of the various data objects and may thereby obtain words, phrases, descriptors, or other semantic objects from the data objects. For example, as noted above, the platform may extract sender/recipient names from e-mail or text messages, or subject matter words from the body of telephone or e-mail communications. Other examples are possible as well. The platform may then present indicia of one or more of those extracted semantic objects, along with indicia of one or more data objects.

The user may then select one or more of the presented items to define a subject-matter for the panel, and the platform may receive data that corresponds to input representing that selection and may responsively determine one or more attributes of the selected items, such as text of the semantic objects, or content or metadata of the data objects, for instance. The platform may then automatically generate for the panel a subject-matter filter that incorporates the determined attribute(s) as filter parameters.

For example, as shown, the platform may have extracted from various received data object the semantic objects "Mary" and "John". Further, the platform may have received a mail data object that contains the word "vacation," and the platform may have extracted that word as a semantic from that data object (and may display the word still in connection with the mail icon). If the user selects the "Mary" and "John" objects and the "vacation" semantic object, the platform may automatically create for the panel a subject matter filter that limits data object association for the filter to data objects related to Mary, John, or vacation. As a result, when the panel is active, the panel would present any such received data objects for convenient viewing by the user.

Figure 10:
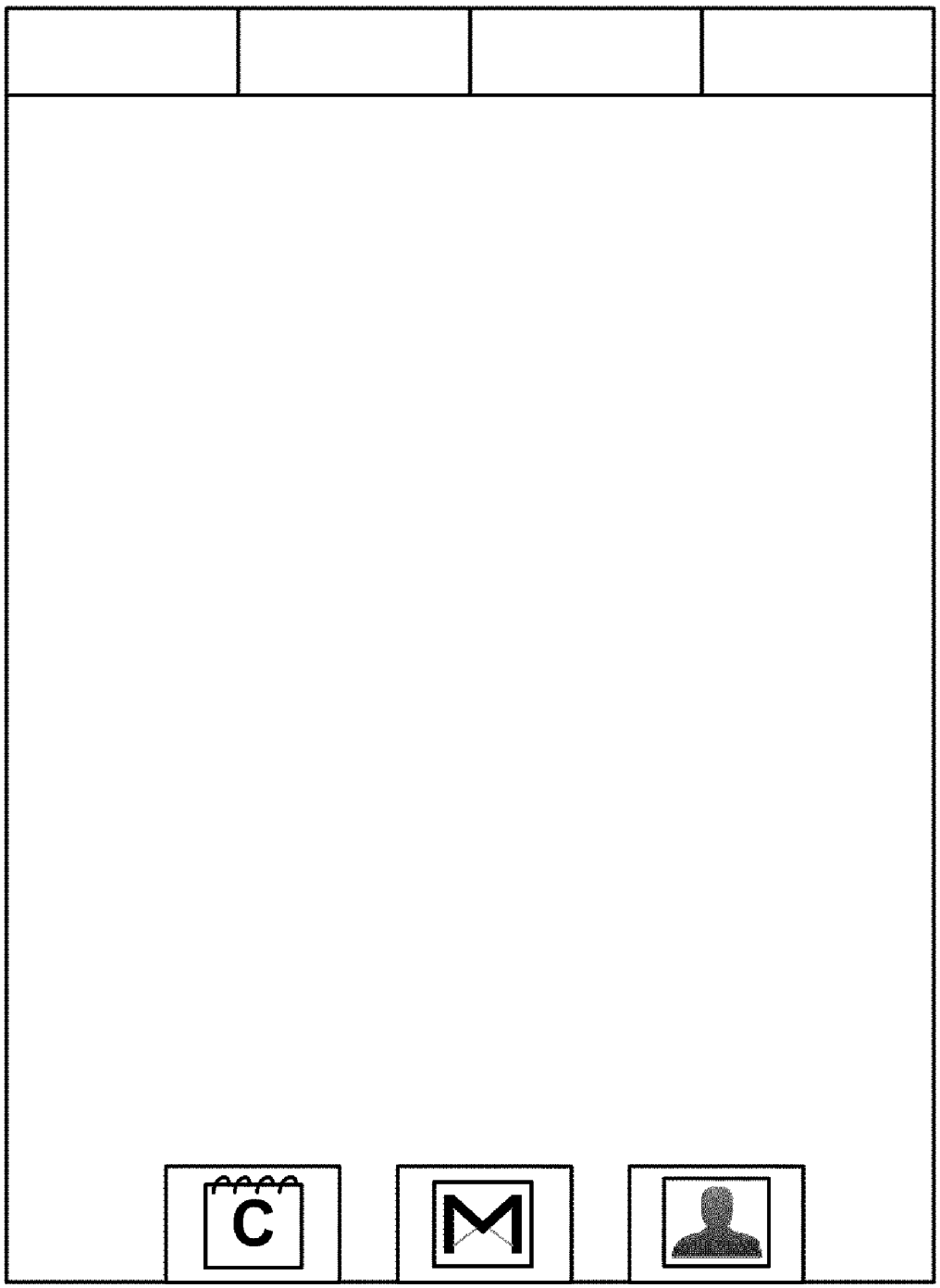

Whether or not the user opts to define a subject-matter filter for the panel, the user may then click on a continue button, such as the arrow button shown at the bottom of the page in FIG. 9. In response, the system may then present the newly defined panel, as shown in FIG. 10. In the illustrated example, FIG. 10 specifically presents no data objects to start. However, over time, as the platform receives data objects that fall within the panel, the platform would cause the panel to be associated with the data objects and the platform would cause the panel of FIG. 10 to display indicia of the data objects, in much the same way as illustrated in FIG. 8.

If the newly created panel is merely a time-based panel, the platform will update the panel to be associated with data objects received while the panel is actively displayed. In particular, while the display is displaying a time-based panel, as the platform receives one or more further data objects, the platform would automatically associate those data objects with the panel (storing the panel and the data objects in a database relationship with each other) and would cause the display to present the data objects in association (as data objects of) the panel. Conveniently, this causes the panel to define a record of data objects relevant to the user during the period that the panel is active.

On the other hand, if the newly created panel is a subject-matter panel, the platform will update the panel to be associated with received data objects that fall within the panel's subject-matter filter. A subject-matter panel may also have a time-based property such that it may be limited to association with data objects that are received while the panel is active, provided that the data objects fall within its subject-matter filter. Alternatively, however, the platform may instead associate a subject-matter panel with data objects that fall within the panel's subject matter filter even if the data objects are received when the panel is not active.

In practice, when a panel is first defined, the platform may store the panel object with various object properties, such as a panel title (user defined or platform defined), a subject-matter filter, and the like. As or when the panel is then actively displayed, or at other times if appropriate, the platform may then update the panel object by determining that particular data objects should be associated with the panel and by storing a database association between the panel object and those data objects (e.g., storing the panel in association with the received additional data objects). Further, when a panel becomes closed in that it is no longer actively displayed, the platform may update the panel object to indicate a time when the panel was last active, so that the graphical user interface can present an indication of when a given panel was last accessed.

Conveniently with this arrangement, a user may readily keep track of and recall the user's data interactions over time. By way of example, when the user is at work and is focused on an engineering project regarding a particular subject, with the project involving user interaction with particular applications on the user's work computer, placing or receiving of various phone calls, playing or recording of various media, and the like. To help the user keep track of that project, the user may run the panel-management program and may define a time-based panel to be associated with currently related data objects, or a subject-matter panel to be associated with the subject of the engineering project.

While busily working on that project, the user may then receive a call from the user's friend Mary to discuss plans for a vacation, which may require the user to do some web research related to the vacation. Thus, the user may need to switch from focusing on the engineering project to focusing on the vacation. To facilitate this, the user may readily create a new subject-matter panel related to Mary and the vacation, and that panel may become associated with data objects representing the call and the web browsing experience. When the user does this, the platform may automatically cause the display to present the new "Mary" panel and to discontinue active presentation of the engineering project related panel.

After finishing the call with Mary, the user may then need to return to work on the engineering project. To facilitate determining what applications the user was focused on, what calls the user had made, and what media the user had recorded or played in that context, the user may then readily select the previously defined time-based panel or subject matter panel, which would present the associated data objects. In particular, through interaction with the graphical user interface, the user may select the previously defined panel. Thus, the platform may receive data corresponding to input defining a request to switch between display of the "Mary" panel and display of the selected panel, and the platform may responsively cause the display to switch from displaying the "Mary" panel (i.e., to discontinue presentation of the "Mary" panel) to re-presenting the previously defined panel.

While the foregoing has described an example mechanism for creation of panels, it will also be understood that other mechanism may be possible as well.

By way of example, the computing system that provides the present panel-management functionality may be arranged to automatically create, and perhaps automatically cause display of, a new subject-matter panel based on user device event and/or state. This act of automatically creating a new subject-matter panel differs from automatically associating a previously-defined panel with newly received data objects pursuant to a subject-matter filter of the previously-defined panel. Rather, in this example, the computing system would automatically create a subject-matter panel, and would thus automatically define the subject matter filter for the subject-matter panel, based on user device event and/or state, which the computing system would learn about by receiving one or more data objects representing the event and/or state.

Optimally, the event and/or state in this example could comprise the user device presenting particular information in response to user request to present the particular information. For example, the event and/or state could be the user device displaying a new application window, tab, or other particular object (e.g., retrieving and presenting a document within an application) in response to receipt of user request to open the new application window, tab, or other particular object. As another example, the event and/or state could be the user device playing particular media (e.g., a particular song or video) in response to user request to play the particular media. Numerous other examples are possible as well.

Advantageously, when the computing system receives one or more data objects that represent a user device presenting particular information in response to user request, such as the user device opening and presenting an application, loading and presenting a document into an application, or playing of particular media, the computing system may automatically create a new subject-matter panel with a filter based on a subject of the data object. The theory here is that the user device presenting particular information in response to user request may indicate that the user is interested in that particular information, and so the computing system may help the user by automatically creating for the user a subject-matter panel that has a subject-matter filter encompassing that information. The computing system may do this without interacting with the user at the time, such as without prompting the user to approve the automatic creation of the subject-matter panel. Alternatively, the computing system may be arranged to request user approval for creation of the subject-matter panel.

In practice, for instance, when the computing system receives one or more data objects, the computing system may evaluate the one or more data objects and determine that they define a record of a user device presenting particular information at user request. For instance, the data objects may specify a user-interface function such as receipt of a user request to present the particular information and/or may specify that the user device presented the particular information in response to user request. Other mechanisms for determining that a data objects represents user device presentation of particular information at user request could be possible as well. In response to determining that the one or more data objects represent user device presentation of particular information at user request, the computing system may then automatically determine one or more create and store a new subject-matter filter keyed to a subject of the particular information.

As a specific example, consider a scenario where a user operating a personal computer opens a word processing application and loads or creates a document containing text and/or images regarding a particular subject. In response, the personal computer may generate and provide a data object that represents the event of the personal computer presenting the document at the user's request (e.g., specifying that the document was opened in response to user input requesting the document to be opened, or specifying that the document was created by user input). Further, the data object may embody or refer to the document itself. Upon receipt of that data object, the computing system may then programmatically analyze the data object and determine from its metadata or content that the personal computer presented information related to that subject in response to user request. In response to making that determination, the computing system may then automatically create a new subject-matter panel for the user, defining for the subject-matter panel a subject-matter filter keyed to that subject. Further, the computing system may automatically cause that personal computer or another device of the user to display the newly created panel.

As another example, consider a scenario where a user operating a media player such as a television or set top box directs the media player to play particular media, such as to tune to and present a particular television program for instance. In response, the media player may generate and provide a data object that represents the event of the media player presenting that particular television program at the user request. Upon receipt of that data object, the computing system may then programmatically analyze the data object and determine from its metadata or content that the media player presented media of a particular genre, a particular title, a particular performer, or having one or more other attributes, and the computing system may automatically create a new subject-matter panel for the user with a subject-matter filter having the same one or more attributes. Further, the computing system may automatically cause a user device to display the newly created panel.

In practice, the computing system may thus receive one or more data objects that define a record that a user device presented particular information at user request. In response, the computing system may hen determine an attribute of the particular information and may automatically create and store a new subject-matter panel having a subject-matter filter keyed to the determined attribute. Further, once the subject-matter panel is created, the computing system may then further automatically associate the panel with additional data objects related to similar information.

Figure 11:
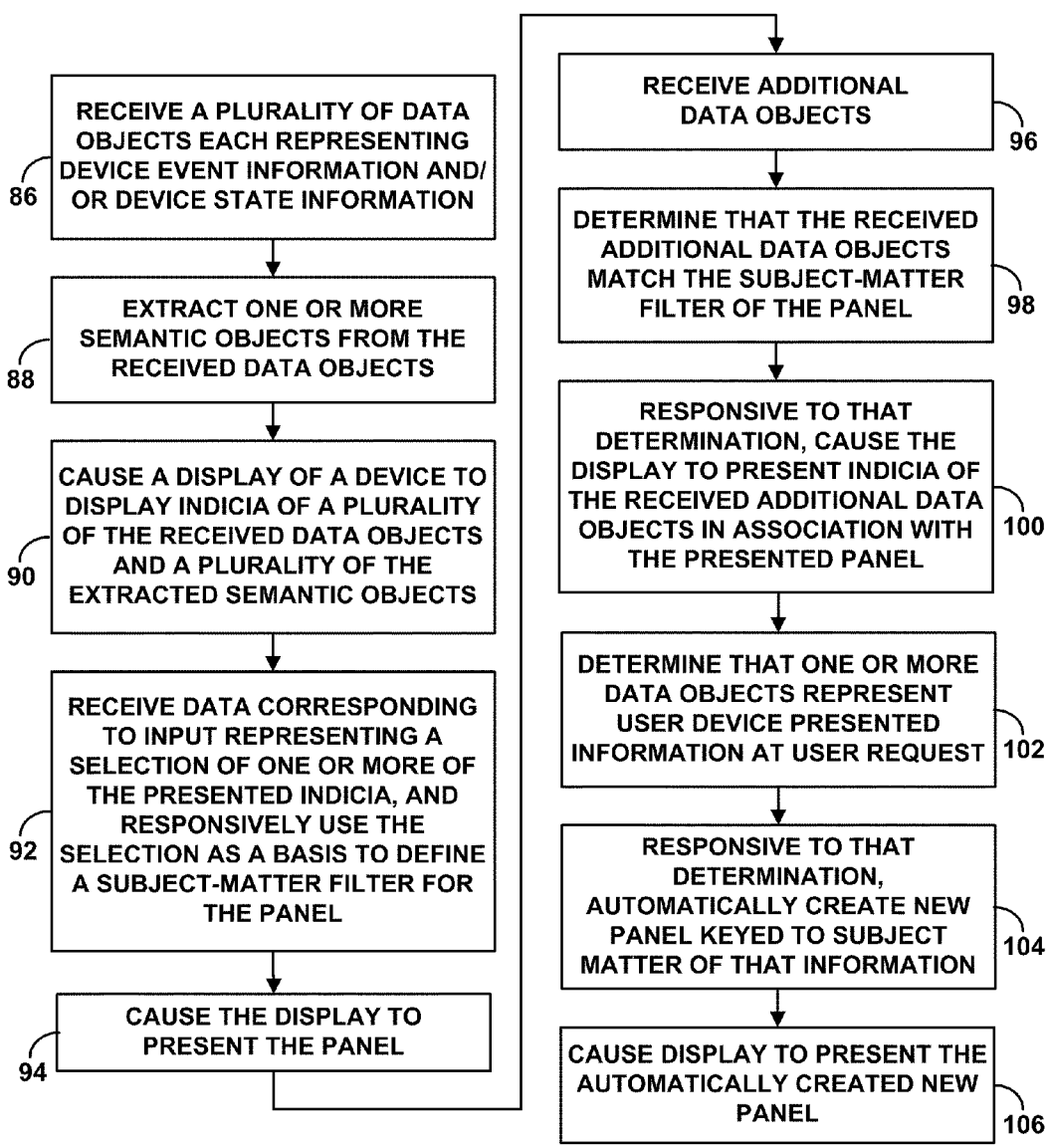
FIG. 11 is a flow chart depicting functions that can be carried out in accordance with the present disclosure.

FIG. 11 is next a flow chart depicting functions that can be carried out in accordance with a representative method. The functions shown in the figure may be carried out in the order shown or in another order and may be combined or distributed in various ways.

As shown in FIG. 11, at block 86, a computing system receives a plurality of data objects each representing device event information and/or device state information. At block 88, the computing system extracts one or more semantic objects from the received data objects. At block 90, the computing system causes a display of a device to display indicia of a plurality of the received data objects and a plurality of the extracted semantic objects. At block 92, the computing system receives data corresponding to input representing a selection of one or more of the presented indicia, and the computing system responsively uses the selection as a basis to define a subject-matter filter for the panel. And at block 94, the computing system causes the display to present the panel.

At block 96, the computing system receives additional data objects. At block 98, the computing system determines that the received additional data objects match the subject-matter filter of the panel. And at block 100, responsive to that determination, the computing system causes the display to present indicia of the received additional data objects in association with the presented panel, and the computing system stores the panel in database association with the received additional data objects.

Further, at block 102, the computing system determines that one or more of the received data objects defines a record that a user device presented particular information at user request. And at block 104, in response to that determination, the computing system determines an attribute of the particular information and automatically creates and stores a new panel having a subject-matter filter keyed to the determined attribute. In addition, at block 106, the computing system causes the display to present the new panel.

It should be understood that for situations in which the embodiments discussed herein collect and/or use any personal information about users or information that might relate to personal information of users, the users may be provided with an opportunity to opt in/out of programs or features that involve such personal information (e.g., information about a user's preferences or a user's contributions to social content providers). In addition, certain data may be anonymized in one or more ways before it is stored or used, so that personally identifiable information is removed. For example, a user's identity may be anonymized so that the no personally identifiable information can be determined for the user and so that any identified user preferences or user interactions are generalized (for example, generalized based on user demographics) rather than associated with a particular user.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. A non-transitory computer readable medium having stored thereon instructions executable by a computing system to carry out functions for panel-based management of data comprising:

receiving data objects from a plurality of sources, and storing the received data objects, wherein each data object defines a record of information regarding at least one of a device event and a device state, and wherein each data object has a timestamp;

storing a plurality of panels each defining a respective association with a set of the received data objects, the plurality of panels including at least one of (i) a time-based panel defining an association with received data objects based on timestamps of the received data objects and (ii) a subject-matter panel defining an association with the received data objects based on subject matter of the received data objects in accordance with a subject-matter filter of the subject-matter panel;

causing a display of a device to display a graphical user interface having at least:
(a) a general data-feed component for presenting indicia of the received data objects, wherein the indicia of the received data objects presented in the general data-feed component are selectable to cause the display to present respectively indicated data objects,
(b) a panel-presentation component for presenting indicia of previously created panels, wherein the presented indicia of the previously created panels include, for each of the previously created panels, presentation of an indicium of a set of received data objects associated with the previously created panel, and
(c) a panel-definition component for receiving commands to create new panels and to further define the previously created panels, for presenting indicia of items selectable to be used as a basis to define a subject-matter filter respectively for any panel, and for receiving selection of one or more of the presented indicia, wherein the items comprise (i) one or more of the received data objects and (ii) one or more semantic objects extracted from the received data objects, and wherein a command to create a new panel is by default a command to create the new panel as a time-based panel unless and until a particular subject-matter filter is defined for the new panel;

receiving data corresponding to input defining one of the commands to create a new panel received through the panel-definition component, and responsively causing the display to present the new panel as a time-based panel to be populated with indicia of any data objects received by the computing system while the new panel is being displayed;

receiving data corresponding to input representing the selection of one or more of the presented indicia of the items to be used as the basis to define the subject-matter filter for a first panel, and responsively defining the subject-matter filter for the first panel based on one or more attributes of one or more items whose presented indicia were selected; and determining that one or more of the received data objects defines a record that a user device presented particular information at user request, and responsively identifying an attribute of the particular information and automatically creating and storing a second panel having a subject-matter filter keyed to the identified attribute.

2. The non-transitory computer readable medium of claim 1, wherein the functions further comprise:
receiving data corresponding to input representing a request to switch between display of a particular panel and display of another panel; and
responsive to the request, causing the display to switch from displaying the particular panel to displaying the other panel.

3. The non-transitory computer readable medium of claim 1, wherein the record of information defined by each of the received data objects comprises a record of information regarding user-interface operation.

4. The non-transitory computer readable medium of claim 1, wherein the indicia of the previously created panels presented by the panel-management component are selectable to cause the display to present expanded indicia of corresponding sets of data objects associated with the indicated panels.

5. The non-transitory computer readable medium of claim 1, wherein the computing system is implemented by the device whose display is caused to display the graphical user interface.

6. The non-transitory computer readable medium of claim 5, wherein the plurality of sources comprise sources selected from the group consisting of (i) logic modules of the device and (ii) other devices in communication with the device.

7. The non-transitory computer readable medium of claim 1, wherein the computing system is implemented as a cloud-based computing system, wherein the plurality of sources comprise devices in network communication with the cloud-based computing system.

8. The non-transitory computer readable medium of claim 7, wherein the device whose display is caused to display the graphical user interface is also in network communication with the cloud-based computing system.

9. The non-transitory computer readable medium of claim 1, wherein the functions further comprise:
automatically causing the display to display the automatically created second panel.

10. The non-transitory computer-readable medium of claim 9, wherein the one or more received data objects defining the record that the user device presented the particular information at user request comprise one or more data objects defining a record that the user device presented a new window at user request, the window containing the particular information.

11. The non-transitory computer readable medium of claim 1, wherein the functions further comprise:
causing the display to present the indicia of the items selectable to be used as the basis to define a new subject-matter filter for the new panel.

12. The non-transitory computer readable medium of claim 11, wherein the functions further comprise:
extracting the one or more semantic objects from the received data objects; and
generating the indicia of the items selectable to be used as the basis to define the new subject-matter filter for the new panel.

13. The non-transitory computer-readable medium of claim 12, wherein a given one of the received data objects represents a message, and wherein extracting the semantic objects comprises:
for the given data object, extracting as at least one of the semantic objects an identity of a sender or recipient of the message.

14. The non-transitory computer readable medium of claim 11, wherein defining the new subject-matter filter for the new panel based on the one or more attributes of the one or more items whose presented indicia were selected comprises:
identifying the one or more attributes of the one or more items whose presented indicia were selected; and
defining the new subject-matter filter of the new panel to limit to any of the received data objects that have the one or more identified attributes.

15. The non-transitory computer-readable medium of claim 14, wherein the functions further comprise:
after defining the subject-matter filter for the new panel, causing the display to display the new panel as a subject-matter panel including an indicium of a set of data objects matching the new subject-matter filter defined for the new panel.

16. A method for panel-based management of data comprising:
receiving into a computing system, from a plurality of devices, data objects each representing one or more of device event information and device state information;
the computing system extracting semantic objects from the received data objects;
the computing system causing a display of a device to display indicia of (i) a plurality of the received data objects and (ii) a plurality of the semantic objects extracted from the received data objects;
the computing system receiving data corresponding to input representing a selection of one or more of the displayed indicia, and the computing system responsively using the selection as a basis to define a first subject-matter filter for a first panel, wherein the selection comprises selecting of the one or more of the displayed indicia of the plurality of received data objects, and wherein using the selection as the basis to define the first subject-matter filter comprises adopting as one or more attributes of the first subject-matter filter one or more attributes of one or more data objects whose indicia were selected;
the computing system causing the display to present the first panel;
the computing system (i) receiving additional data objects, (ii) determining that the received additional data objects match the first subject-matter filter of the first panel, and (iii) responsive to the determining, causing the display to present indicia of the received additional data objects in association with the presented first panel;
the computing system determining that one or more of the received data objects defines a record that a user device presented particular information at user request, and the computing system responsively identifying an attribute of the particular information and automatically creating and storing a second panel having a second subject-matter filter keyed to the identified attribute;
the computing system causing the display to present the second panel;
the computing system receiving data corresponding to input defining a command to create a new panel, wherein, unless and until a particular subject-matter filter is defined for the new panel, the command to create the new panel is by default a command to create the new panel as a time-based panel that defines an association with the received data objects based on timestamps of the received data objects; and
responsive to receiving the data corresponding to the input defining the command to create the new panel, the computing system causing the display to present the new panel as a new time-based panel to be populated with indicia of any data objects received by the computing system while the new panel is being displayed.

17. The method of claim 16, further comprising:
the computing system storing the first panel in association with the received additional data objects;
the computing system causing the display to discontinue presentation of the first panel; and
the computing system subsequently receiving data representing input defining a request to re-present the first panel, and the computing system responsively causing the first panel to be re-presented.

18. A non-transitory computer-readable medium having stored thereon instructions executable by a computing system to carry out functions for panel-based management of data comprising:
receiving from a plurality of devices data objects each representing one or more of device event information and device state information;
extracting semantic objects from the received data objects;
causing a display of a device to present indicia of (i) a plurality of the received data objects and (ii) a plurality of the semantic objects extracted from the received data objects;
receiving data corresponding to input representing a selection of one or more of the presented indicia, and using the selection as a basis to define a first subject-matter filter for a first panel, wherein the selection comprises selecting of the one or more of the presented indicia of the plurality of received data objects, and wherein using the selection as the basis to define the first subject-matter filter comprises adopting as one or more attributes of the first subject-matter filter one or more attributes of one or more data objects whose indicia were selected;
causing the display to present the first panel;
receiving one or more additional data objects, determining that the one or more received additional data objects match the first subject-matter of the first panel, and responsive to the determining, (i) associating the first panel with the one or more received additional data objects and (ii) causing the display to present indicia of the one or more received additional data objects in association with the presented first panel;
storing the first panel in association with the received additional data objects;
determining that one or more of the received data objects defines a record that a user device presented particular information at user request, and responsively identifying an attribute of the particular information and automatically creating and storing a second panel having a second subject-matter filter keyed to the identified attribute;
causing the display to present the second panel;
receiving data corresponding to input representing a request to create a new panel, wherein, unless and until a particular subject-matter filter is defined for the new panel, the request to create the new panel is by default a request to create the new panel as a new time-based panel that defines an association with the received data objects based on timestamps of the received data objects;
in response to receiving the data corresponding to the input representing the request to create the new panel, creating and causing the display to present the new time-based panel;
while the display is presenting the new time-based panel, receiving one or more further data objects and automatically causing the display to present the one or more received further data objects in association with the presented new time-based panel; and
storing the new time-based panel in association with the one or more received further data objects.

* * * * *